No. 742,533. PATENTED OCT. 27, 1903.
E. WALTHER.
CARBURETER.
APPLICATION FILED MAY 9, 1903.
NO MODEL.

WITNESSES:
Albert C. Lisch
Guy C. Clements

Edward Walther
INVENTOR
BY C. C. Clements & Co.
ATTORNEYS

No. 742,533.

Patented October 27, 1903.

UNITED STATES PATENT OFFICE.

EDWARD WALTHER, OF DAVENPORT, IOWA.

CARBURETER.

SPECIFICATION forming part of Letters Patent No. 742,533, dated October 27, 1903.

Application filed May 9, 1903. Serial No. 156,357. (No model.)

*To all whom it may concern:*

Be it known that I, EDWARD WALTHER, a citizen of the United States, residing at Davenport, in the county of Scott and State of Iowa, have invented certain new and useful Improvements in Carbureters, of which the following is a specification.

My invention relates to improvements in carbureters, and more particularly to that class of carbureters in which air is forced through gasolene to produce a gas by the mixture of the air with the gasolene.

The object of the invention is to produce a carbureter in which the vents through which the air passes into the gasolene will be held automatically at a predetermined distance below the surface of the gasolene at all times, thus insuring a uniform mixture of air and gasolene, and consequently a gas of equal richness at all times. This object I attain by the construction and arrangement of parts illustrated in the accompanying drawings and hereinafter fully described and claimed.

Figure 1:
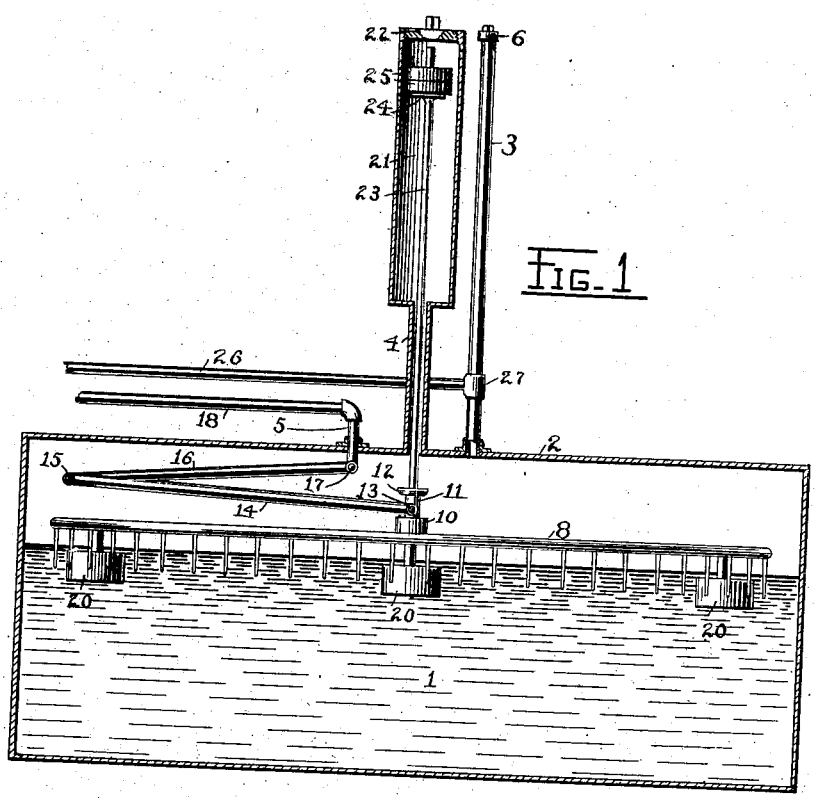
Figure 2:
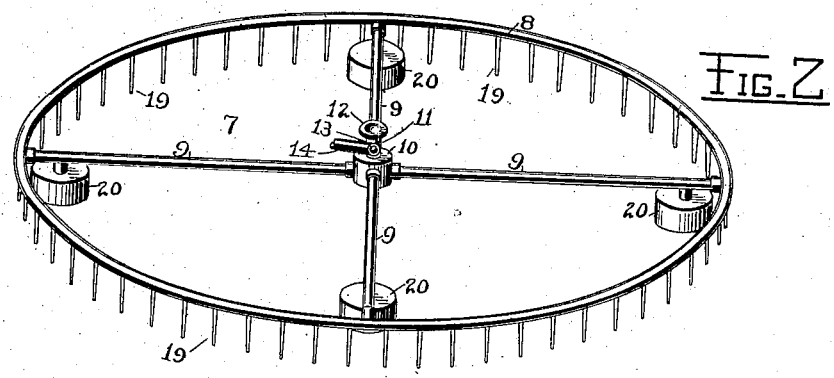
Figure 3:
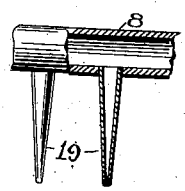

Referring to the accompanying drawings, in which the same parts are designated by the same numerals of reference throughout the several views, Figure 1 represents a central vertical section through a carbureter constructed in accordance with my invention. Fig. 2 represents a perspective view of the floating frame or injector for supporting the air-vents below the surface of the gasolene. Fig. 3 is a detail view representing a section, on an enlarged scale, through one of the air-vents and the pipes to which it is attached.

In the present embodiment of my invention I employ a tank 1, of any suitable size and preferably cylindrical in form, having a cover 2, secured upon the top in any suitable manner to prevent the escape of the gas. The top 2 is perforated at suitable points to receive the pipes 3, 4, and 5, which communicate with the interior of the tank. The pipe 3 extends some distance above the tank and is provided at its upper end with a gas-tight cap 6, which may be removed in order to pour gasolene into the tank through the pipe 3.

Within the tank 1 I place the injector 7, consisting of a frame formed of a circular piece of piping 8, to which is connected a series of tubular arms 9, radiating from a central hub 10. From the hub 10 a short pipe 11 extends upwardly, having at its top a flat or dished cap 12, for a purpose to be hereinafter explained. Connected by a pivoted coupling 13 to the pipe 11 is a pipe 14, which in turn is connected by a pivoted coupling 15 with another pipe 16, and this latter pipe is connected by a pivoted coupling 17 with the pipe 5, passing through the cover 2 of the tank. Thus it will be seen that the injector 7 may be moved up and down within the tank without affecting or moving the pipe 5, to which it is connected. The pipe 5 is connected by a pipe 18 with any suitable source of compressed air, from which air under pressure may be admitted to the piping of the injector 7.

Projecting downwardly from the circular pipe 8 of the frame 7 is a series of vent-pipes 19, arranged at intervals of a few inches entirely round the circumference of the said frame and long enough to project some distance into the gasolene when the injector 7 is supported just above the surface thereof.

Secured to the under side of the tubular arms 9 is a series of floats 20, of such a size as will support the injector 7 upon the surface of the gasolene, with the points of the vent-pipes 19 extending a short distance below the surface. These vent-pipes 19, as shown in Fig. 3, communicate with the interior of the circular pipe 8 and have vents about the size of a needle through their lower ends.

The pipe 4, which opens into the tank through the center of the cover 2, has connected to its upper end a chamber 21, having a gas-tight cap 22, and through this pipe 4 is placed a rod 23, the lower end of which rests upon the cap 12 of the short pipe 11 at the center of the injector. The upper end of the rod 23 extends into the chamber 21, where it is provided with a shoulder 24, upon which may be placed weights 25 for the purpose of depressing the injector 7 and causing the vent-pipes 19 to sink deeper into the gasolene in the tank.

A service-pipe 26 is connected by any suitable connection 27 with the pipe 3 to conduct the gas to the building or other place of consumption.

The operation of the invention is as follows: The injector being in proper position in the tank and the cover secured thereon, gasolene is poured in through the pipe 3 until the tank is about two-thirds full, the injector 7 floating upon the surface of the gasolene, with the ends of the vent-pipes 19 immersed therein. Air is then admitted under pressure through the pipes 18, 5, 16, 14, and 11 to the hub 10, filling the arms 9 and circular pipe 8, and finally passing through the vent-pipes 19 into the gasolene, through which it will rise, agitating the gasolene and becoming charged therewith. The resultant gas will fill the upper part of the tank, from whence it may be drawn through the service-pipe 26. Weights 25 are placed upon the upper end of the rod 23 and rest upon the shoulder 24 thereon. This weight is communicated to the injector through the rod 23, which rests upon the cap 12, supported above the hub 10, and serves to keep the ends of the vent-pipes 19 at a predetermined distance below the surface of the gasolene, thus keeping the gas uniform. Should the gas be too rich, the amount of weight is decreased, allowing the vent-pipes 19 to rise by reason of the floats 20, thus decreasing the distance through which the air has to travel through the gasolene, or if the gas is not rich enough more weight can be added to sink the vent-pipes deeper into the gasolene.

It will be understood that I do not wish to limit myself to the precise details of construction as herein described, as slight changes or modifications may be made therein without departing from the spirit of the invention.

It will be seen that a carbureter constructed as herein described is simple, cheap, and durable, easily adjusted to produce gas of any desired richness, and not liable to get out of order.

Having thus described my invention, what I claim, and desire to secure by Letters Patent of the United States, is—

1. In a carbureter, in combination, a gasolene-supply tank, and an air-distributer arranged to move vertically within the tank and a weighted rod incased in a guide-tube, resting at its lower extremity upon the vertically-movable air-distributer.

2. In a carbureter, the combination with a tank and means for introducing gasolene therein, of an air-distributer within said tank, consisting of a circular tubular frame, means for supplying air to said frame, vents from said air-distributer immersed in the gasolene and means for introducing air under pressure to said air-distributer.

3. In a carbureter, the combination with a tank and means for introducing gasolene therein, of an air-distributer adapted to float upon the gasolene in the tank and having vents immersed therein, said air-distributer consisting of a circular tubular frame, supply-pipes leading to said frame, a hub common to said supply-pipes, and jointed feed-pipes leading to said hub, and means for introducing air under pressure to said air-distributer.

4. In a carbureter, the combination with a tank and means for introducing gasolene therein, of an air-distributer adapted to float upon the gasolene in the tank and having vents immersed therein, means for weighting said air-distributer to keep the vents at a predetermined distance below the surface of the gasolene, and means for introducing air under pressure to said air-distributer.

5. In a carbureter, the combination with a tank, means for introducing gasolene therein, and means for drawing gas therefrom; of an air-distributer adapted to float upon the gasolene in said tank and composed of a circular tubular frame, a hub having supply-pipes leading to said frame, and having vents immersed therein, and means for introducing air under pressure to said air-distributer.

6. In a carbureter, the combination with a tank, means for introducing gasolene therein, and means for drawing gas therefrom; of an air-distributer within said tank composed of a circular tubular frame, a hub, supply-pipes leading from the hub to the frame, floats supporting said air-distributer upon the surface of the gasolene, vents on said air-distributer extending below the surface of the gasolene, means for weighting said air-distributer and means for introducing air under pressure to said air-distributer.

In testimony whereof I affix my signature in presence of two witnesses.

EDWARD WALTHER.

Witnesses:
E. L. SALING,
L. A. MUELLER.